United States Patent
Chiou et al.

(10) Patent No.: US 7,429,333 B2
(45) Date of Patent: Sep. 30, 2008

(54) METHOD FOR FABRICATING MICRONEEDLE ARRAY AND METHOD FOR FABRICATING EMBOSSING MOLD OF MICRONEEDLE ARRAY

(75) Inventors: Jin-Chern Chiou, Hsinchu (TW); Chen-Chun Hung, Linyuan Township, Kaohsiung County (TW); Chih-Wei Chang, Yangmei Township, Taoyuan County (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 11/691,573

(22) Filed: Mar. 27, 2007

(65) Prior Publication Data
US 2008/0157427 A1   Jul. 3, 2008

(30) Foreign Application Priority Data
Jan. 3, 2007   (TW) .............................. 96100248 A

(51) Int. Cl.
*B44C 1/22* (2006.01)
*C25F 3/00* (2006.01)
(52) U.S. Cl. ...................................... 216/11
(58) Field of Classification Search ................... 216/11; 604/21
See application file for complete search history.

(56) References Cited

U.S. PATENT DOCUMENTS

| 6,334,856 | B1 | 1/2002 | Allen et al. |
| 6,622,035 | B1 | 9/2003 | Merilainen et al. |
| 6,690,959 | B2 | 2/2004 | Thompson |
| 6,782,283 | B2 | 8/2004 | Schmidt et al. |
| 6,962,772 | B2 | 11/2005 | Liu et al. |
| 2002/0082543 | A1* | 6/2002 | Park et al. ...................... 604/21 |
| 2002/0133129 | A1* | 9/2002 | Arias et al. ................. 604/272 |
| 2004/0054393 | A1 | 3/2004 | Stemme et al. |
| 2004/0060902 | A1* | 4/2004 | Evans et al. .................... 216/41 |

OTHER PUBLICATIONS

P. Griss, et al, Micromachined Electrodes For Biopotential Measurements, J. of Microelectromechanical Systems, vol. 10 No. 1, 2001.
San Jun Moon, et al, Fabrication of Microneedle Array Using LIGA And Hot Embossing Process, Microsystem Technologies, vol. 11, p. 311-318, Apr. 2005.

* cited by examiner

*Primary Examiner*—Roberts Culbert
(74) *Attorney, Agent, or Firm*—Ming Chow; Sinorica, LLC

(57) ABSTRACT

The present invention discloses a method for fast fabricating microneedle arrays with an embossing process and a method for fabricating an embossing mold of a microneedle array, wherein a master pattern of a high aspect ratio silicon microneedle array is fabricated with a microelectromechanical technology, and the master pattern is used to fabricate an embossing mold; a thermosetting material is filled into the embossing mold; then, baking, pressing and mold-stripping are undertaken; thereby, disposable solid polymer microneedle arrays can be batch-fabricated.

28 Claims, 13 Drawing Sheets

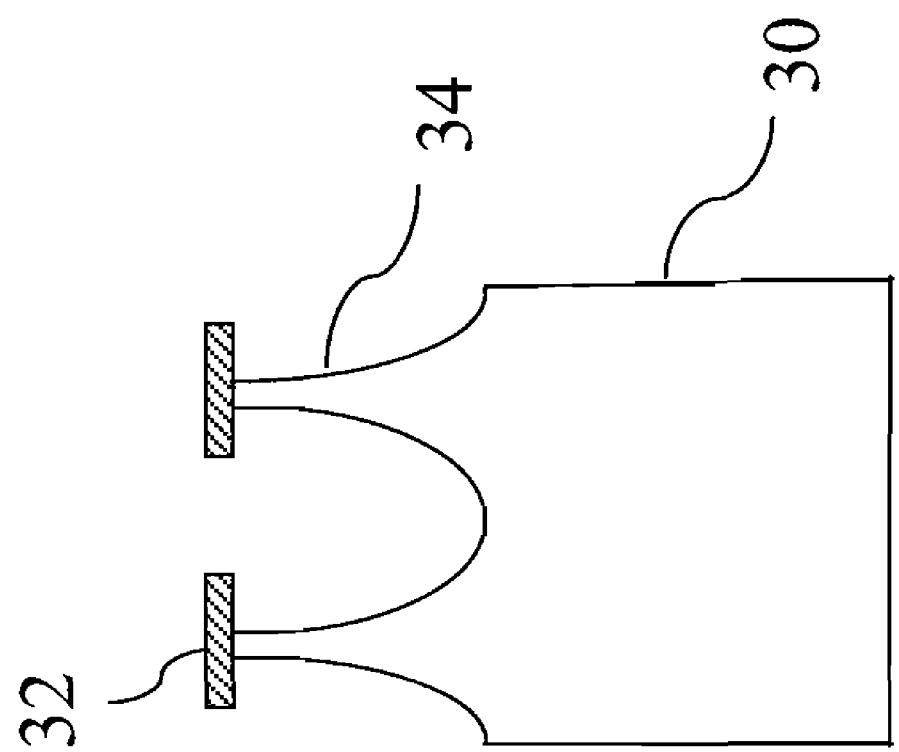

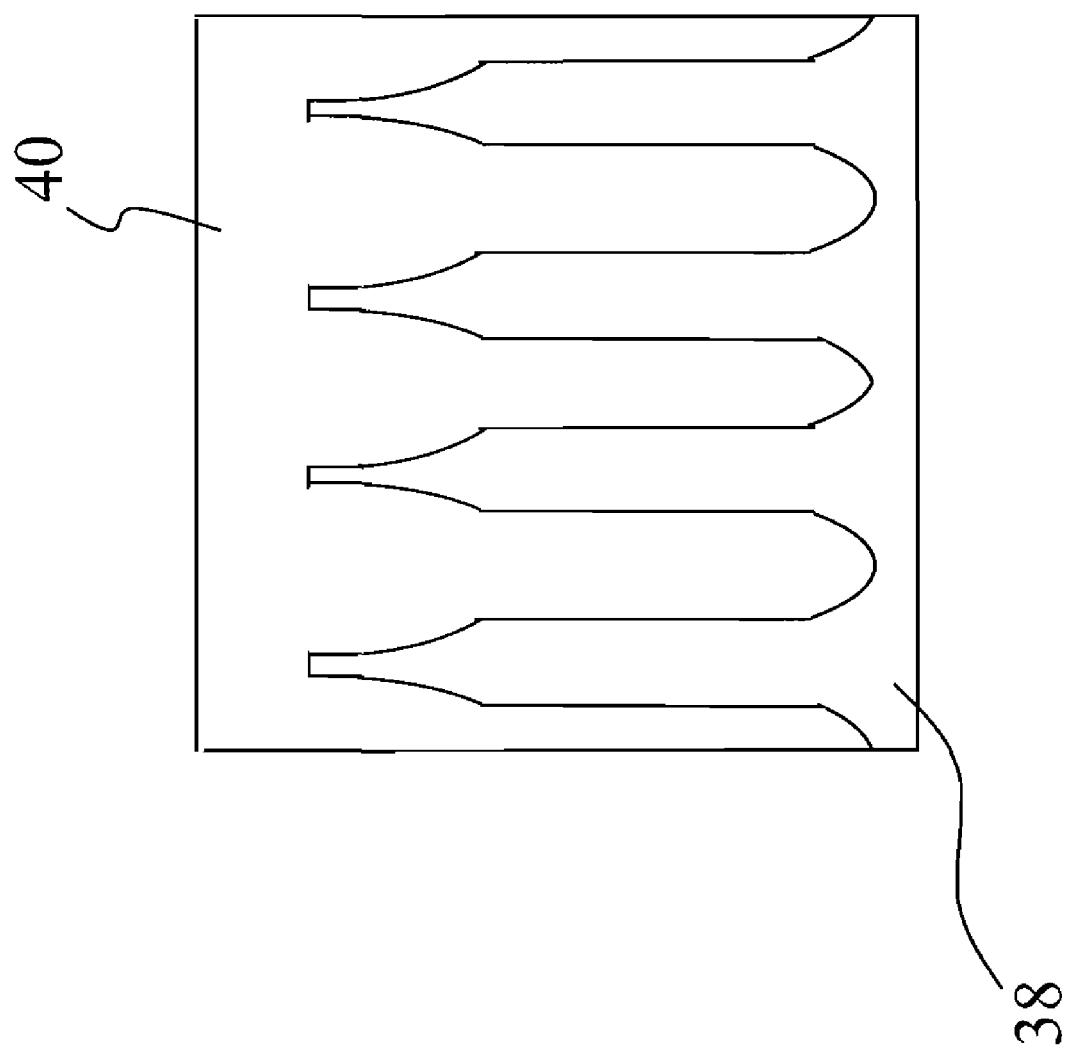

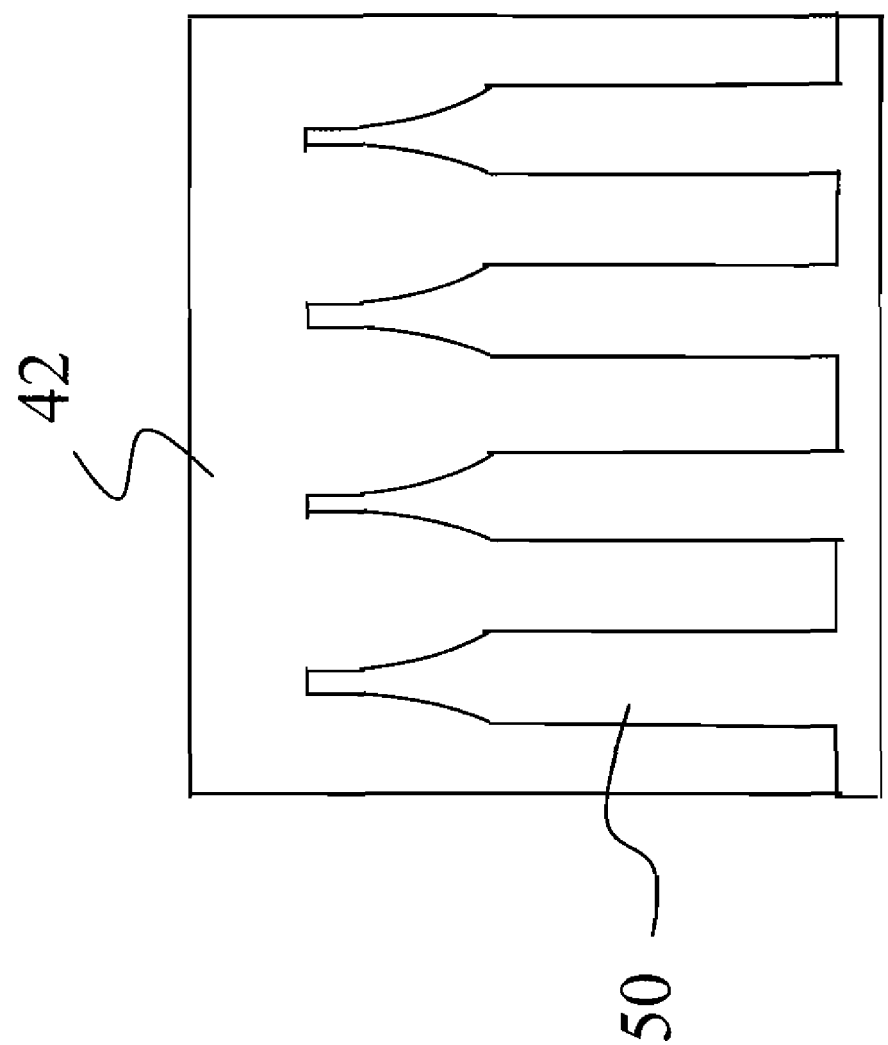

METHOD FOR FABRICATING MICRONEEDLE ARRAY AND METHOD FOR FABRICATING EMBOSSING MOLD OF MICRONEEDLE ARRAY

BACKGROUND OF THE INVENTION

1. Field of the Invention

The present invention relates to a method for fabricating a microneedle array, particularly to a method for batch-fabricating a disposable microneedle array and a method for fabricating an embossing mold of the microneedle array.

2. Description of the Related Art

Refer to FIG. 1 for a sensing electrode used by a conventional physiological inspection system. Such a sensing electrode is apt to be affected by the inferior electric conductivity of the corneum 12. Therefore, the corneum 12 has to be wetted with electrically-conductive glue 18 to improve electric conduction. However, the improvement of the overall detection capability is very limited. Thus, a microneedle structure 20 shown in FIG. 2 was developed to function as a sensing electrode. The microneedles 22 can penetrate the corneum 12 and enter the epidermis 14 which is composed of living cells and has a superior electric conductivity. Therefore, the microneedle structure 20 can obtain better detection results without using the electrically-conductive glue. Further, the length of the microneedles 22 are designed not to enter the corium 16 lest the testee feel pain and bleed. As the microneedle structure has the above-mentioned advantages, it has replaced the conventional sensing electrode and been extensively used in physiological inspection systems.

A Taiwan patent No. 00594870 discloses a method for fabricating a hollow microneedle array, wherein inclined planes are formed with a wet etching method, and a PDMS (poly dimethylsiloxane) material is mold-stripped from the inclined planes to form the inclined planes of the needle tip. However, such a structure is used in a syringe system. When applying to physiological measurement, the abovementioned microneedle array has too large a needle size and too sparse microneedle density. A U.S. patent No. 2004/0054393A1 disclosed a microneedle array, wherein the microneedle arrays are fabricated with a microelectromechanical technology one by one. Therefore, the fabrication process thereof is too complicated, and the cost thereof is too high. A U.S. Pat. No. 6,334,856B1 disclosed a needle structure and the application thereof, wherein a single etching process together with a metallic blocking layer is used to fabricate a needle structure. However, the depth of the needle structure is insufficient, and the needle tip is not sharp enough.

Accordingly, the present invention proposes a higher-density and higher-aspect ratio microneedle array with sharper needle tips, which can be fast batch-fabricated, and a method for fabricating an embossing mold of a microneedle array to overcome the abovementioned conventional problems.

SUMMARY OF THE INVENTION

The primary objective of the present invention is to provide a method for fabricating a microneedle array and a method for fabricating an embossing mold of a microneedle array, wherein an embossing method is used to batch fabricate atoxic polymer microneedle arrays; thereby, the cost thereof is greatly reduced; thus, the disposability thereof is achieved.

Another objective of the present invention is to provide a method for fabricating a microneedle array and a method for fabricating an embossing mold of a microneedle array, which can offer a more convenient measurement interface in the field of physiological monitoring.

Yet another objective of the present invention is to provide a method for fabricating a microneedle array and a method for fabricating an embossing mold of a microneedle array, whereby microneedle arrays of superior quality consistency can be fast batch-fabricated.

Still another objective of the present invention is to provide a method for fabricating a microneedle array and a method for fabricating an embossing mold of a microneedle array, whereby a higher-density and higher-aspect ratio microneedle array with sharper needle tips can be fabricated.

Further another objective of the present invention is to provide a method for fabricating a microneedle array and a method for fabricating an embossing mold of a microneedle array, whereby a high-transparency polymer microneedle array can be fabricated. The high-transparency polymer microneedle array can apply to the field of the invasive medical process, such as the infrared medical image or the infrared oximeter, or the field of the invasive hi-tech personal identification, such as the infrared blood vessel personal identification system.

To achieve the abovementioned objectives, the present invention proposes a method for fabricating a microneedle array, which comprises the following steps: providing a HAR (High Aspect Ratio) microneedle array as the master pattern; spin-coating a first plastic material over the master pattern to form an embossing mold; filling a second plastic material into the embossing mold, and undertaking the baking, pressing, mold-stripping and curing processes of the second plastic material to obtain a polymer microneedle array.

The present invention also proposes a method for fabricating an embossing mold of a microneedle array, which comprises the following steps: providing a HAR microneedle array as the master pattern; spin-coating a first plastic material on the master pattern, removing the gas bubbles inside the first plastic material, and undertaking the baking, pressing the first plastic material to form a first polymer layer; mold-stripping and curing processes of the first polymer layer in a vacuum state.

To enable the objectives, technical contents, characteristics and accomplishments of the present invention to be easily understood, the embodiments of the present invention are to be described in detail below.

BRIEF DESCRIPTION OF THE DRAWINGS

FIG. 4(a) and FIG. 4(b) are diagrams schematically showing the process of utilizing a master pattern to fabricate an embossing mold;

FIG. 5(a) to FIG. 5(c) are diagrams schematically showing the process of utilizing an embossing mold to fabricate a polymer microneedle array.

DETAILED DESCRIPTION OF THE INVENTION

The present invention is to provide a method for fabricating a microneedle array and a method for fabricating an embossing mold of a microneedle array, whereby microneedle arrays can be batch-fabricated, and the disposability of the microneedle arrays can be achieved. The microneedle arrays fabricated according to the present invention can apply to various fields, such as electroencephalographs, physiological monitoring systems, biological chips and brain wave sensors.

Figure 1:
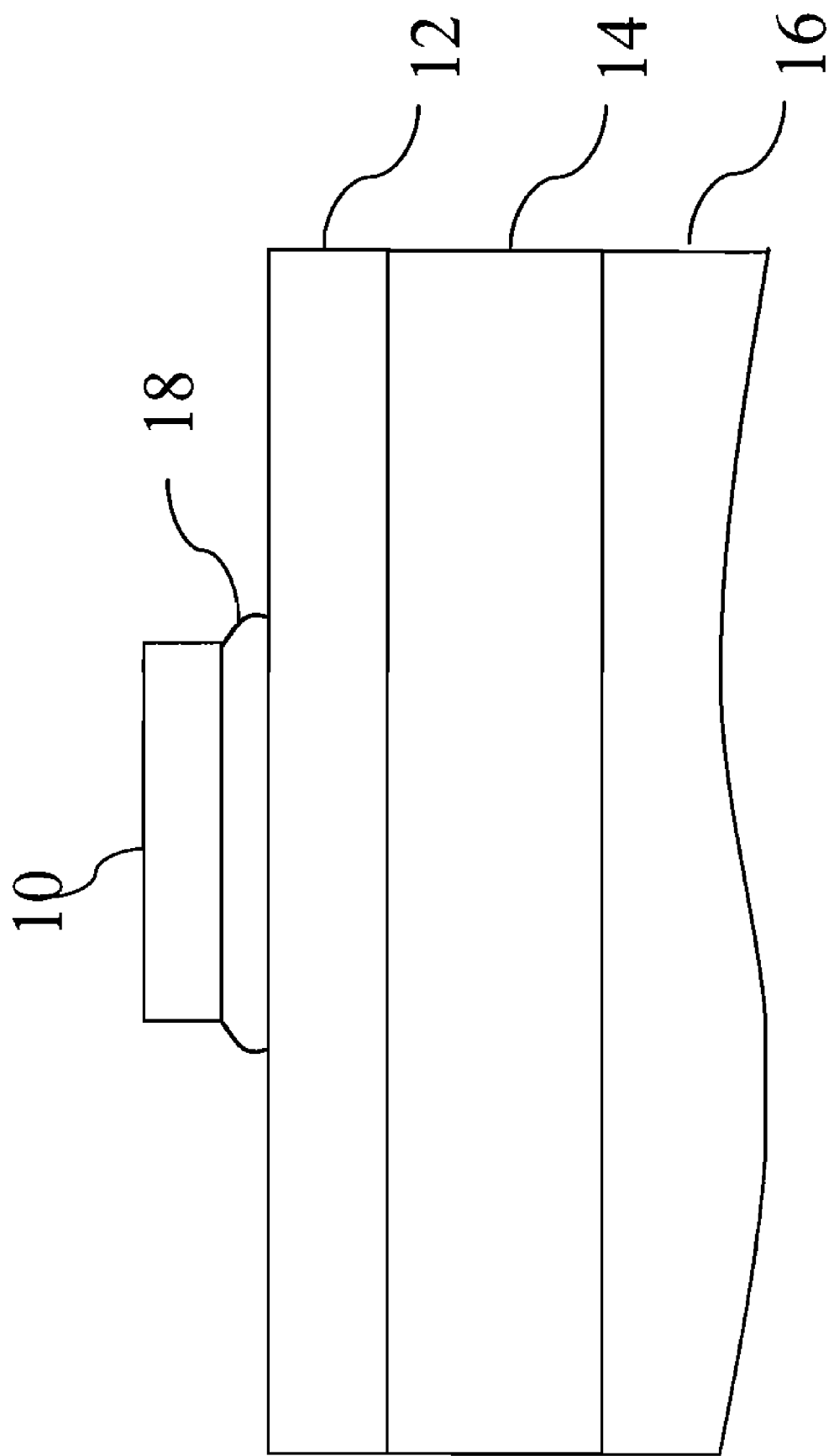
FIG. 1 is a diagram schematically showing that a conventional sensing electrode is used to measure a physiological signal.
Figure 2:
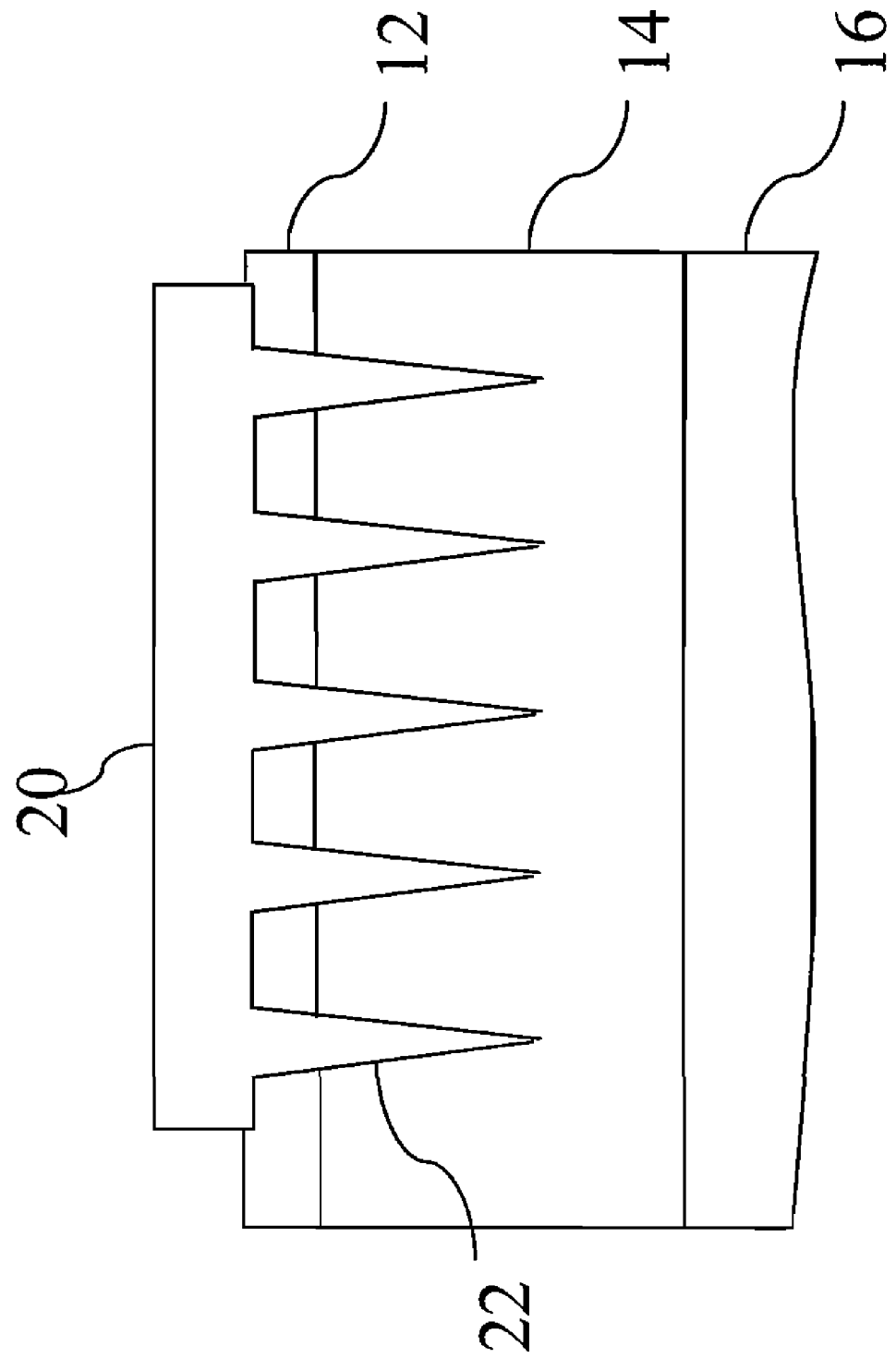
FIG. 2 is a diagram schematically showing that a conventional microneedle array functioning as a sensing electrode is used to measure a physiological signal.
Figure 3:
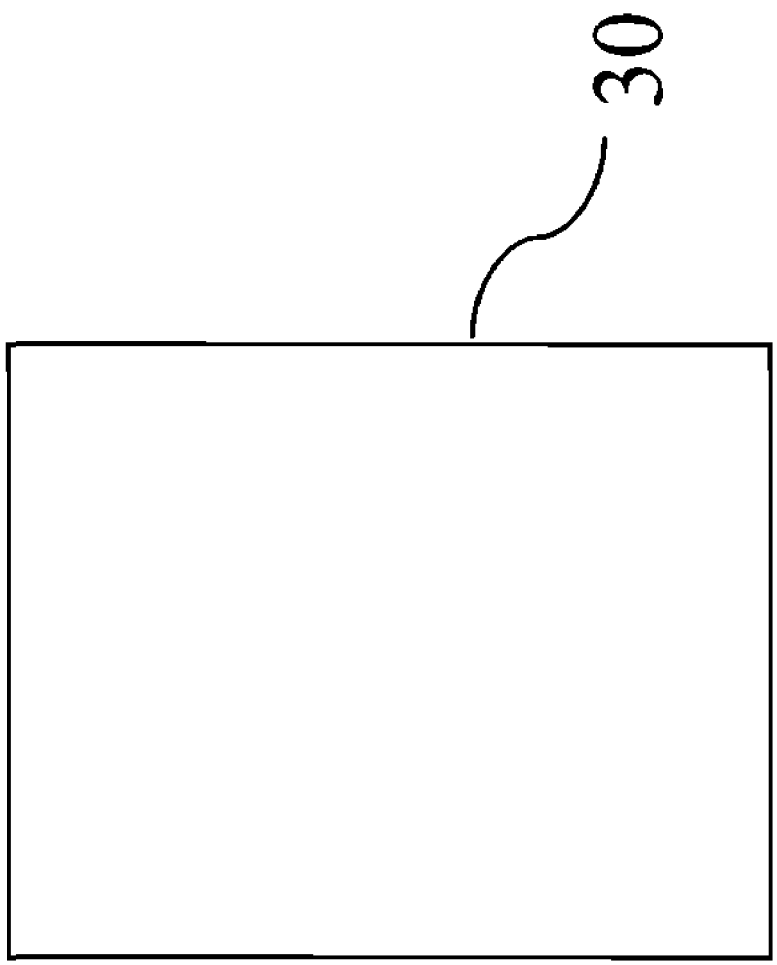
FIG. 3(a) to FIG. 3(e) are diagrams schematically showing the process of fabricating a master pattern of a microneedle array with a microelectromechanical technology.
Figure 3:
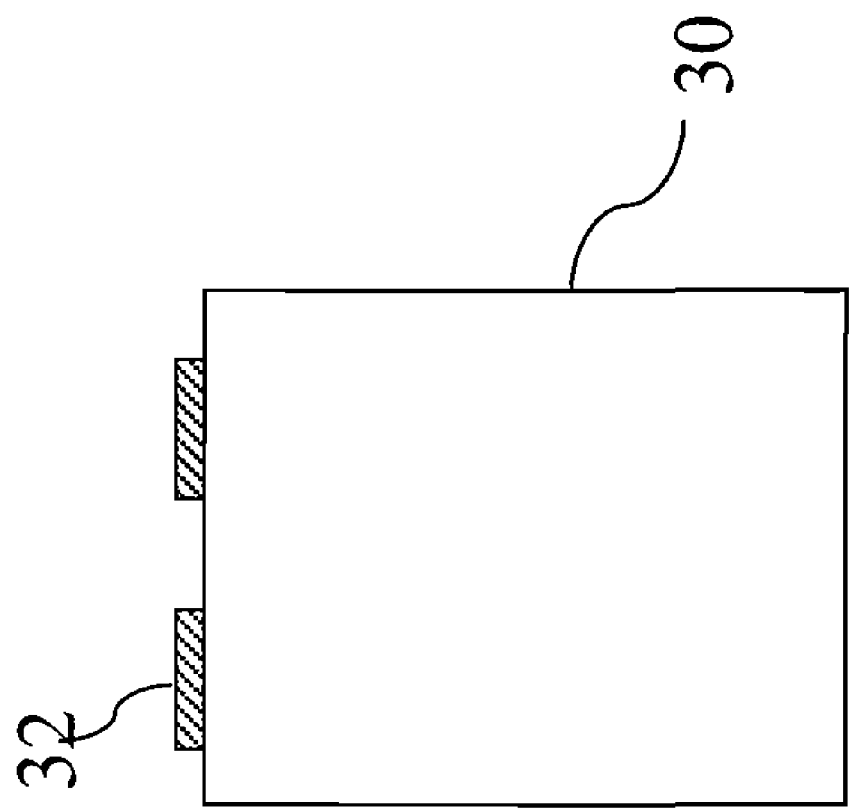
Figure 3D:
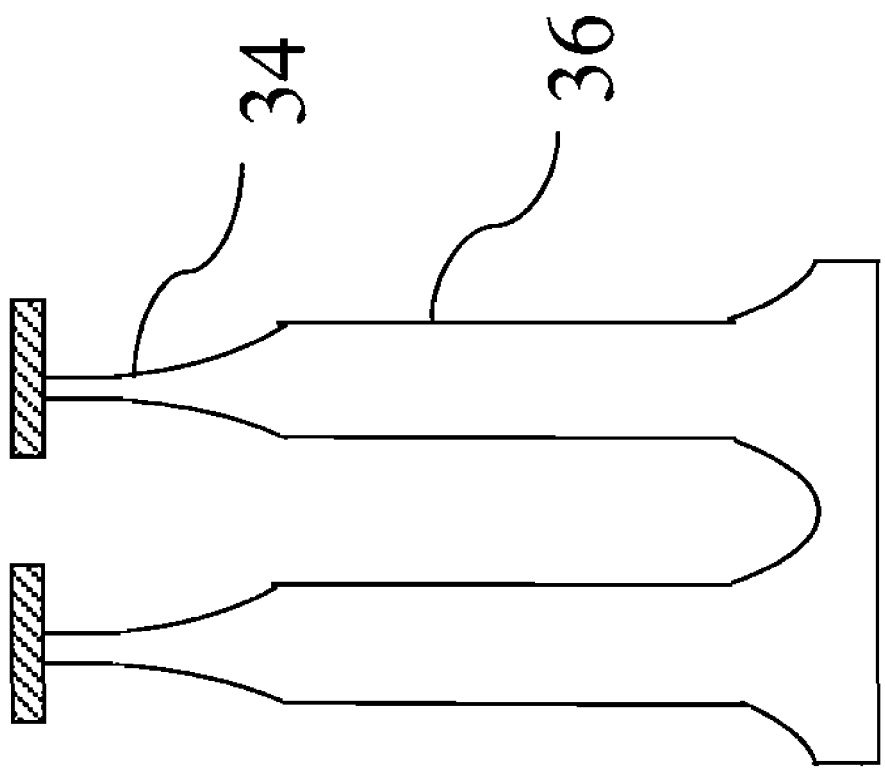
Figure 3E:
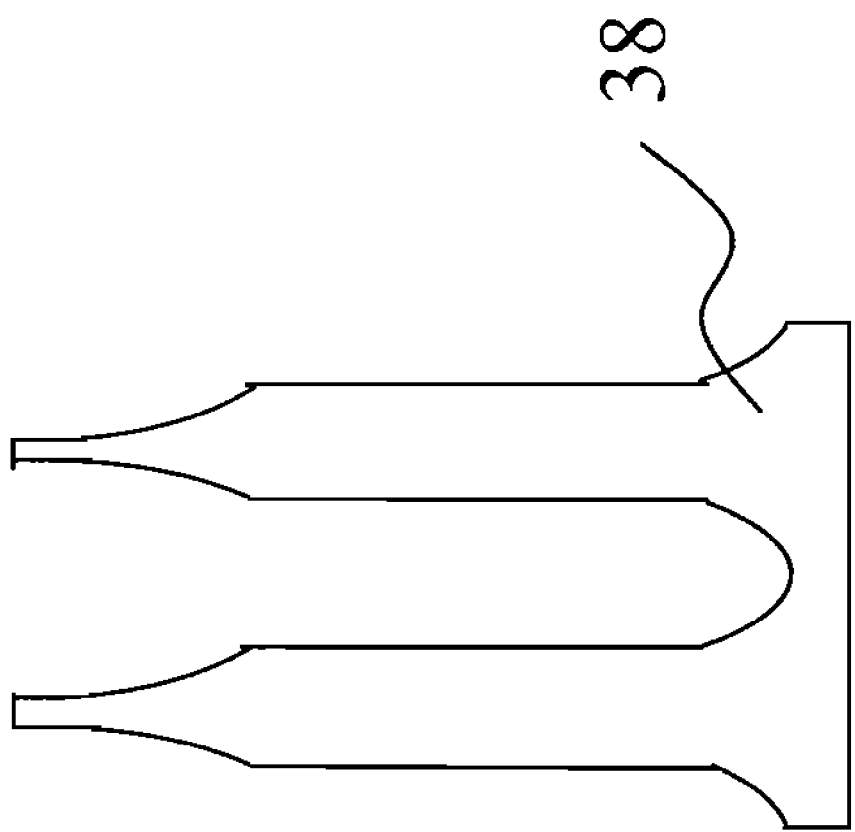

Refer to from FIG. 3(a) to FIG. 3(e) for the pre-stage fabrication process according to the method of the present invention. Firstly, as shown in FIG. 3(a), a silicon substrate 30 is provided. Next, as shown in FIG. 3(b), a photolithographic technology is used to define several circular patterned thick photoresist layers as blocking layers 32, and then the blocking layers 32 are hard baked. Next, as shown in FIG. 3(c), an isotropic etching process is undertaken with the blocking layers being the mask to obtain the shape of needle tips 34. Next, as shown in FIG. 3(d), an anisotropic etching process is undertaken to obtain HAR needle columns 36, wherein the arcs formed in the isotropic etching process are preserved and descend to the bottommost region. Next, as shown in FIG. 3(e), the blocking layers 32 are removed with a dry etching process or a wet etching process to obtain a HAR master pattern 38 of a microneedle array, wherein the microneedle has a height of between 100 and 800 μm and a width of between 10 and 50 μm.

Figure 4B:
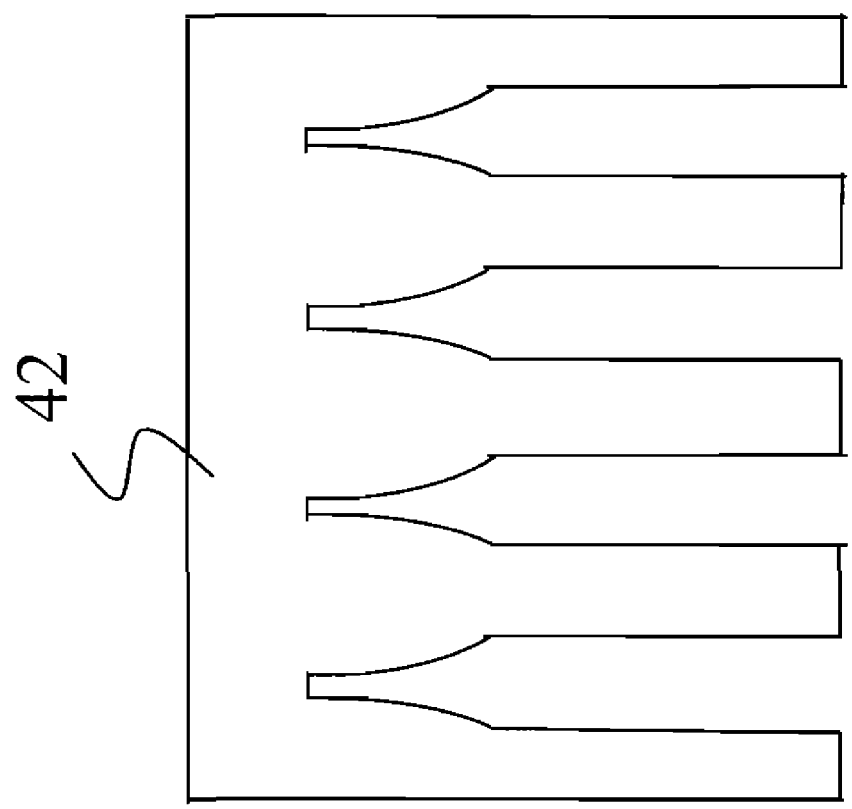

Refer to FIG. 4(a) and FIG. 4(b) diagrams schematically showing the procedures of fabricating an embossing mold in the post-stage fabrication process according to the method of the present invention. Firstly, as shown in FIG. 4(a), a polymer material is spin-coated over the master pattern 38 to form a polymer layer 40, wherein the polymer material may be a plastic material, such as PDMS (poly dimethylsiloxane). Next, the gas bubbles inside the polymer layer 40 are removed, and the baking and pressing processes of the polymer layer 40 are undertaken in a vacuum state, and then the mold-stripping and curing processes are undertaken with the temperature and the baking time being the control parameters. Thus, an embossing mold 42, like that shown in FIG. 4(b), is obtained. The embossing mold 42 can be repeated used many times and suitable for batch-type fabrication. Further, the plastic material may be heated at a temperature of between 75 and 105° C. for from 120 to 180 seconds before the plastic material is spin-coated over the master pattern 38; thereby, the dimension of the embossing mold 42 will be more precise, and mold stripping will be easier.

Figure 5B:
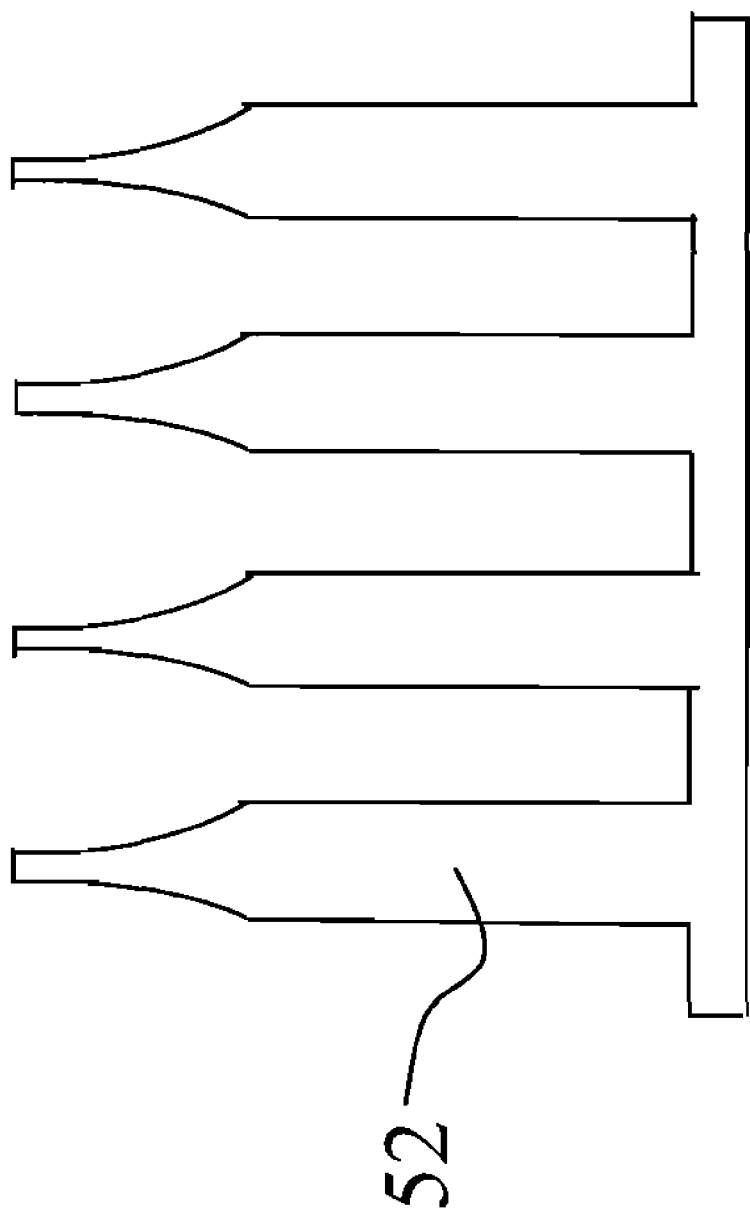
Figure 5C:
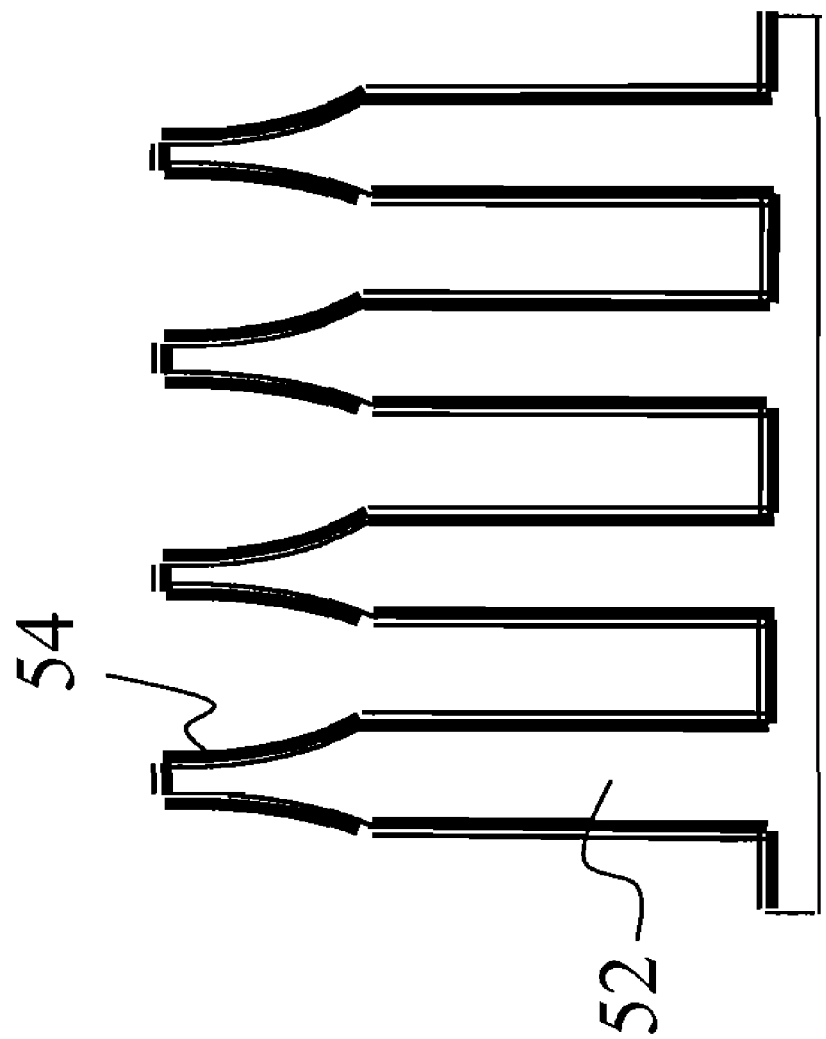

Refer to from FIG. 5(a) to FIG. 5(c) diagrams schematically showing the procedures of utilizing the abovementioned embossing mold 42 to fabricate a disposable microneedle array in the post-stage fabrication process according to the method of the present invention.

Firstly, as shown in FIG. 5(a), an atoxic plastic material, such as PDMS or PMMA (polymethylmethacrylate), is uniformly filled into the embossing mold 42 to form a formation layer 50.

Next, the gas bubbles inside the formation layer 50 are removed, and the baking and pressing processes of the formation layer 50 are undertaken in a vacuum state (For example, the formation layer 50 is baked at a temperature of between 235 and 270° C. for 1 hour.), and then the mold-stripping and curing processes are undertaken with the temperature being the control parameter to obtain a disposable polymer microneedle array 52, like that shown in FIG. 5(b), wherein the temperature is inversely proportional to the mold-stripping time, i.e. the higher the temperature, the shorter the mold-stripping time. Besides, as shown in FIG. 5(c), the microneedle array, like that shown in FIG. 5(b), may be coated with a titanium or platinum electrically-conductive layer 54 via a sputtering method to form a cheap and disposable microelectrode array.

When the material of the polymer microneedle array is the same as that of the embossing mold, a parting agent may be previously applied to the mold cavity of the embossing mold to benefit mold stripping before filling the material of microneedle array.

Figure 6B:
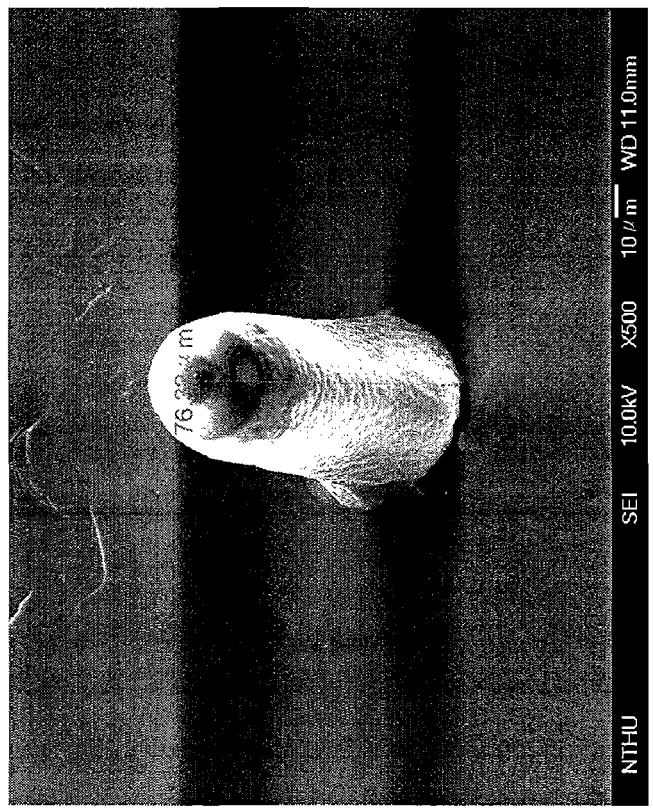
FIG. 6(a) and FIG. 6(b) are the SEM images of the microneedle array fabricated according to the present invention.
Figure 6A:
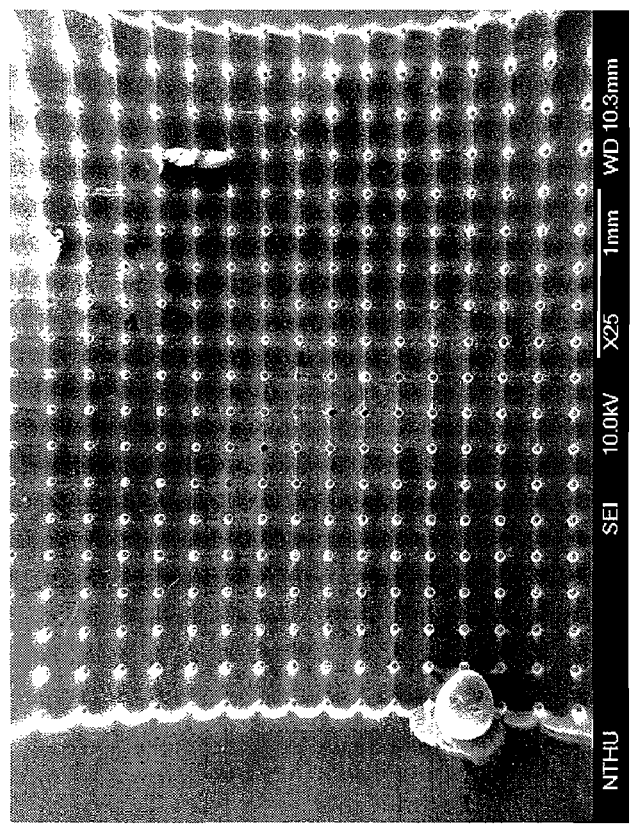

Refer to FIG. 6(a) and FIG. 6(b) the images captured by a SEM (Scanning Electron Microscope) with the sample table thereof tilted by 20 degrees. From FIG. 6(b), the height of the microneedle of this embodiment is estimated to be about 230 μm.

The microneedle array having the electrically-conductive layer can apply to the biomedical field to undertake physiological signal measurement. The microneedle array without the electrically-conductive layer but with a superior transparency can apply to the field of the invasive medical process, such as the infrared medical image or the infrared oximeter, or the field of the invasive hi-tech personal identification, such as the infrared blood vessel personal identification system.

In summary, the present invention proposes a method for fabricating a microneedle array and a method for fabricating an embossing mold of a microneedle array, wherein a precision master pattern of a microneedle array with a specified appearance, microneedle density and aspect ratio is fabricated with a microelectromechanical technology; the master pattern is used to fabricate an embossing mold; and an atoxic thermosetting material is uniformly filled into the embossing mold to obtain a disposable atoxic polymer microneedle array. The method of the present invention, which adopts an embossing method to batch-fabricate microneedle arrays, promotes the fabrication efficiency of microneedle arrays and reduces the cost thereof and thus benefits the disposability of microneedle arrays. Therefore, the present invention can provide cheap and disposable measurement interfaces for the field of physiological monitoring where the microneedle arrays are most frequently used.

Those described above are only the preferred embodiments to exemplify the present invention. However, it is not intended to limit the scope of the present invention. Any equivalent modification or variation according to the spirit of the present invention is to be also included within the scope of the present invention.

What is claimed is:

1. A method for fabricating a microneedle array, comprising the following steps:
   providing a high aspect ratio microneedle array as a master pattern;
   spin-coating a first plastic material over said master pattern to form an embossing mold; and
   filling a second plastic material into said embossing mold, and undertaking baking, pressing, mold-stripping and curing procedures of said second plastic material to obtain a polymer microneedle array; and
   said second plastic material is PDMS (poly dimethylsiloxane) or PMMA (polymethylmethacrylate).

2. The method for fabricating a microneedle array according to claim 1, wherein the fabrication of said master pattern comprises the following steps:

providing a substrate;

forming a blocking layer over said substrate;

performing an isotropic etching step and an anisotropic etching step sequentially with said blocking layer being mask to obtain a master pattern of a high aspect ratio microneedle array; and removing said blocking layer.

3. The method for fabricating a microneedle array according to claim 1, wherein said microneedle has a height of between 100 and 800 µm and a width of between 10 and 50 µm.

4. The method for fabricating a microneedle array according to claim 1, wherein when said second plastic material is identical to said first plastic material, a parting agent is previously applied to mold cavity of said embossing mold before said second plastic material is filled into said embossing mold.

5. The method for fabricating a microneedle array according to claim 1, wherein said first plastic material is PDMS (poly dimethylsiloxane).

6. The method for fabricating a microneedle array according to claim 2, wherein the material of said substrate is silicon.

7. The method for fabricating a microneedle array according to claim 1, further comprising a step of forming an electrically-conductive layer over said polymer microneedle array.

8. The method for fabricating a microneedle array according to claim 7, wherein said polymer microneedle array with said electrically-conductive layer apply to biomedical field for physiological measurement.

9. The method for fabricating a microneedle array according to claim 1, wherein said polymer microneedle array apply to field of invasive medical processes.

10. The method for fabricating a microneedle array according to claim 1, wherein said polymer microneedle array apply to field of invasive hi-tech personal identification.

11. The method for fabricating a microneedle array according to claim 1, wherein time of said mold-stripping procedure is controlled with temperature.

12. The method for fabricating a microneedle array according to claim 7, wherein material of said electrically-conductive layer is titanium or platinum.

13. The method for fabricating a microneedle array according to claim 2, wherein said blocking layer is removed with a dry etching method or a wet etching method.

14. The method for fabricating a microneedle array according to claim 1, wherein after said first plastic material is spin-coated over said master pattern, a step of removing gas bubbles inside said first plastic material and a step of baking, pressing, mold-stripping and curing said first plastic material in a vacuum state follows.

15. The method for fabricating a microneedle array according to claim 14, wherein said first plastic material is previously heated at a temperature of between 75 and 105° C. for from 120 to 180 seconds before said first plastic material is spin-coated over said master pattern.

16. The method for fabricating a microneedle array according to claim 1, wherein said baking procedure is undertaken at a temperature of between 230 and 270° C. for 1 hour.

17. A method for fabricating an embossing mold of a microneedle array, comprising the following steps:

providing a high aspect ratio microneedle array as a master pattern;

spin-coating a first plastic material over said master pattern to form a first polymer layer;

removing gas bubbles inside said first polymer layer;

undertaking baking, pressing, mold-stripping and curing procedures of said first polymer layer to obtain an embossing mold of said microneedle array; and filling a second plastic material into said embossing mold and a step of baking, pressing, mold-stripping and curing said second plastic material to obtain a polymer microneedle array, wherein said second plastic material is PDMS (poly dimethylsiloxane) or PMMA (polymethylmethacrylate).

18. The method for fabricating an embossing mold of a microneedle array according to claim 17, wherein the fabrication of said master pattern comprises the following steps:

providing a substrate;

forming a blocking layer over said substrate;

performing an isotropic etching step and an anisotropic etching step sequentially with said blocking layer being mask to obtain a master pattern of a high aspect ratio microneedle array; and removing said blocking layer.

19. The method for fabricating an embossing mold of a microneedle array according to claim 17, wherein said microneedle has a height of between 100 and 800 µm and a width of between 10 and 50 µm.

20. The method for fabricating an embossing mold of a microneedle array according to claim 17, wherein when said second plastic material is identical to said first plastic material, a parting agent is previously applied to mold cavity of said embossing mold before said second plastic material is filled into said embossing mold.

21. The method for fabricating an embossing mold of a microneedle array according to claim 17, wherein said first plastic material is PDMS (poly dimethylsiloxane).

22. The method for fabricating an embossing mold of a microneedle array according to claim 17, further comprising a step of forming an electrically-conductive layer over said polymer microneedle array.

23. The method for fabricating an embossing mold of a microneedle array according to claim 22, wherein said polymer microneedle array with said electrically-conductive layer apply to biomedical field for physiological measurement.

24. The method for fabricating an embossing mold of a microneedle array according to claim 17, wherein said polymer microneedle array apply to field of invasive medical processes.

25. The method for fabricating an embossing mold of a microneedle array according to claim 17, wherein said polymer microneedle array apply to field of invasive hi-tech personal identification.

26. The method for fabricating an embossing mold of a microneedle array according to claim 22, wherein material of said electrically-conductive layer is titanium or platinum.

27. The method for fabricating an embossing mold of a microneedle array according to claim 17, wherein said first plastic material is previously heated at a temperature of between 75 and 105° C. for from 120 to 180 seconds before said first plastic material is spin-coated over said master pattern.

28. The method for fabricating an embossing mold of a microneedle array according to claim 17, wherein said baking procedure is undertaken at a temperature of between 230 and 270° C. for 1 hour.

* * * * *